United States Patent
Steele, Jr. et al.

(10) Patent No.: US 6,618,804 B1
(45) Date of Patent: Sep. 9, 2003

(54) SYSTEM AND METHOD FOR REARRANGING BITS OF A DATA WORD IN ACCORDANCE WITH A MASK USING SORTING

(75) Inventors: Guy L. Steele, Jr., Lexington, MA (US); Peter Lawrence, San Jose, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/545,021

(22) Filed: Apr. 7, 2000

(51) Int. Cl.$^7$ .................................................. G06F 7/00
(52) U.S. Cl. ........................ 712/300; 712/224; 708/209
(58) Field of Search .................................. 712/300, 223, 712/224, 221, 220; 708/209, 200, 210, 211

(56) References Cited

U.S. PATENT DOCUMENTS

| | | | | |
|---|---|---|---|---|
| 4,583,199 A | * | 4/1986 | Boothroyd et al. ......... 712/300 |
| RE33,664 E | * | 8/1991 | Kang et al. ............. 711/109 X |
| 5,487,159 A | * | 1/1996 | Byers et al. ................. 712/223 |
| 5,682,340 A | * | 10/1997 | Arends et al. .............. 708/209 |
| 5,696,922 A | * | 12/1997 | Fromm ........................... 711/5 |
| 5,777,906 A | * | 7/1998 | Lau et al. .................... 708/209 |
| 6,098,087 A | * | 8/2000 | Lemay ........................ 708/209 |

OTHER PUBLICATIONS

Knuth, Donald E. The Art of Computer Programming, vol. 3: Sorting and Searching, second edition. Addison–Wesley, Reading, Massachusetts, 1998. Section 5.3.4: Networks for Sorting (pp. 219–247).

* cited by examiner

*Primary Examiner*—Henry W. H. Tsai
(74) *Attorney, Agent, or Firm*—Cesari and McKenna LLP

(57) ABSTRACT

A system is disclosed for rearranging data units of a data word in accordance with a mask word, the mask word having a plurality of mask bits each associated with a data unit, each mask bit having one of a set condition and a clear condition. The system includes an array of interconnected swap modules organized in a series of swap stages, each swap module having two inputs and two outputs. Each swap module is configured to receive at each input a data unit and associated mask bits and couple the data units to the respective outputs in relation to the associated mask bit's condition.

4 Claims, 3 Drawing Sheets

SORTING NETWORK 12

US 6,618,804 B1

SYSTEM AND METHOD FOR REARRANGING BITS OF A DATA WORD IN ACCORDANCE WITH A MASK USING SORTING

FIELD OF THE INVENTION

The invention relates generally to the field of digital computers and more specifically to functional units for processing predetermined types of instructions. The invention particularly provides a circuit or functional unit for use in connection with execution of an instruction for rearranging bits of a data word in accordance with a mask.

BACKGROUND OF THE INVENTION

Computers process data in accordance with instructions. One type of instruction which has been proposed is a so-called "sheep and goats" instruction which accepts as operands a data word and a mask word and rearranges the bits of the data word in accordance with the mask word. In the rearranged data word, the bits of the data word in bit positions which correspond to bits of the mask which are clear, or have the value "zero," are shifted to the "left" end of the rearranged data word with their order being preserved, and the bits of the data word in bit positions which correspond to bits of the mask which are set, or have the value "one," are shifted to the right end of the data word with their order being preserved. For example, if an eight bit data word has the value "abcdefgh" (where the letters represent binary integers having the value "one" or "zero"), and the mask word corresponds to "10011011," in the rearranged data word generated when the "sheep and goats" instruction is executed with these as operands, the bits "b," "c," and "f," all of which are in bit positions for which the mask bits are clear would be shifted to the left, preserving their order "bcf," and the bits "a," "d," "e," "g," and "h," all of which are in bit positions for which the mask bits are set would be shifted to the right, preserving their order "adegh," with the result being the rearranged data word "bcfadegh." Essentially, the "sheep and goats" instruction results in a rearrangement of bits of a data word into two groups as defined by bits of a mask word, one group (the "sheep") corresponding to those bits for which the bits of the mask word are clear, and the other (the "goats") corresponding to those bits for which the bits of the mask word are set, and in addition preserves order in each group.

In a variant of the "sheep and goats" instruction, the bits of the rearranged data word in bit positions for which the bits of the mask are either set or clear (but preferably not both) will be set to a predetermined value. Generally, it has been proposed, for example, that the bits of the rearranged data word in bit positions for which the bits of the mask are clear will be set to zero, but the variant may be used with either the "sheep" or the "goats," and the predetermined value may be either "one" or "zero."

A "sheep and goats" instruction can find utility in connection with, for example, performing various bit permutations, for example, using a mask consisting of alternating set and clear bits will result in a so-called "unshuffle" permutation of a data word. In addition, the variant can be useful in connection with using a set of originally discontiguous bits to perform a multi-way dispatch, or jump, by making the bits contiguous and using the result to form an index into a jump table.

SUMMARY OF THE INVENTION

The invention provides a new and improved circuit or functional unit for use in connection with execution of an instruction for rearranging bits of a data word in accordance with a mask.

In brief summary, the invention provides a system for rearranging data units of a data word in accordance with a mask word, the mask word having a plurality of mask bits each associated with a data unit, each mask bit having one of a set condition and a clear condition. The system includes an array of interconnected swap modules organized in a series of swap stages, each swap module having two inputs and two outputs. Each swap module is configured to receive at each input a data unit and associated mask bits and couple the data units to the respective outputs in relation to the associated mask bit's condition.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
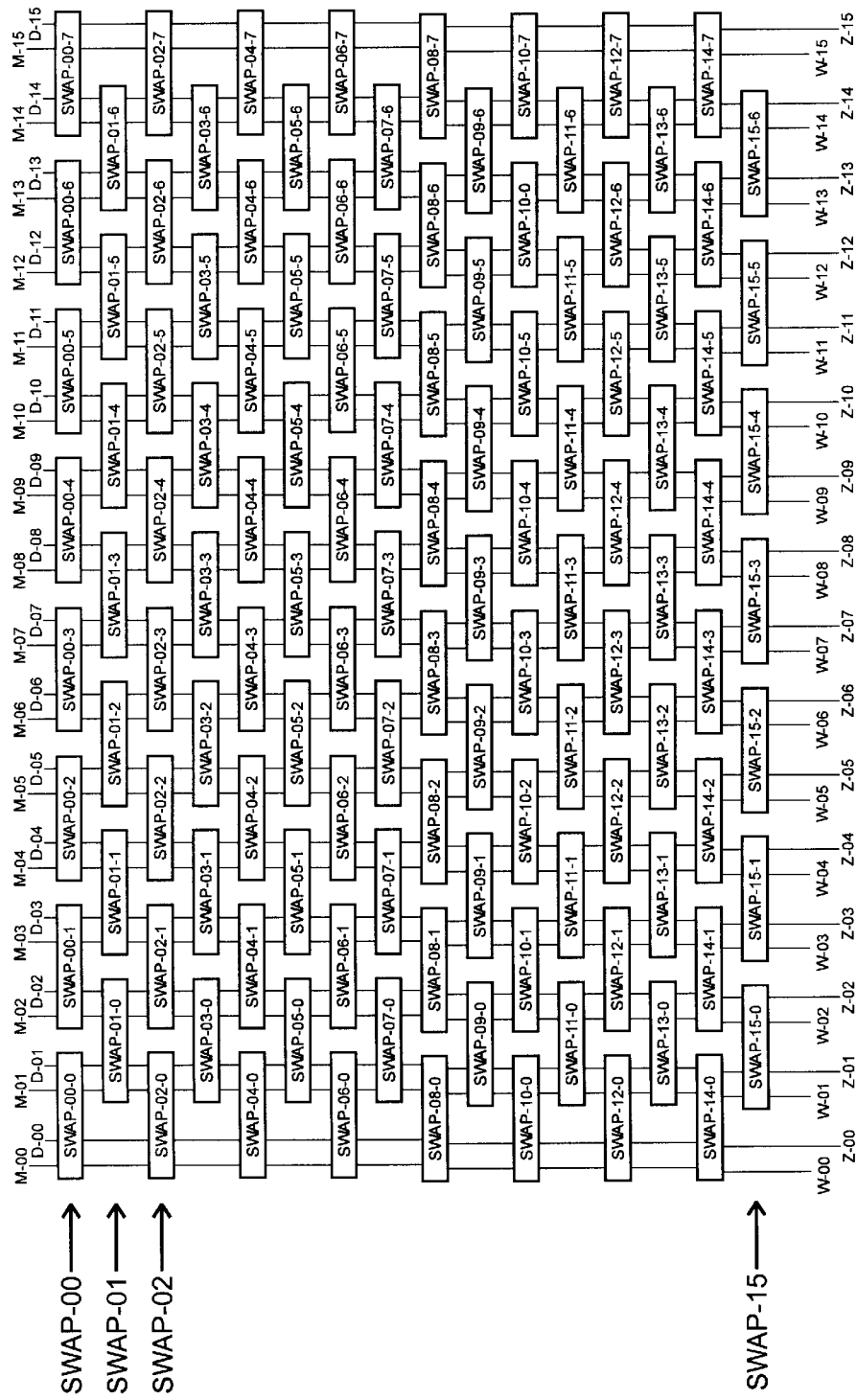
FIG. 1 depicts a functional block diagram of a circuit or functional unit for use in connection with execution of an instruction for rearranging bits of a data word in accordance with a mask, in accordance with the invention.

FIG. 1 depicts a functional block diagram of a circuit or functional unit 10 for use in connection with execution of an instruction for rearranging bits of a data word in accordance with a mask, in accordance with the invention. With reference to FIG. 1, functional unit 10 includes a sorting network 11 which receives an "N" bit input data word comprising data bits in data bit positions D0 through DN-1 (generally identified by reference numeral Dn) and an "N" bit mask word comprising mask bits in mask bit positions M0 through MN-1 (generally identified by reference numeral Mn), with each mask bit Mn being associated with the correspondingly-indexed data bit Dn, with "n" being the index. The functional unit 10 provides an "N" bit output data word comprising output data bits in bit positions Z0 through ZN-1 (generally identified by reference numeral Zn) whose bits correspond to the bits in positions Dn of the input data word associated with bits of the mask word which are clear (that is, which have the binary value "zero") packed to the left in the output word, and the bits in positions Dn of the input data word for which the bits of the mask word which are set (that is, which have the binary value "one") packed to the right in the output word, with the order of the bits being preserved as between the group of data bits Dn for which the mask bits Mn are set and the group of data bits Dn for which the mask bits are clear. In addition, the sorting network 11 provides an output mask comprising bits in bit positions W0 through WN-1 (generally identified by reference numeral Wn), whose bits correspond to the bits Mn of the mask word with the bits which are clear packed to the left and the bits which are set packed to the right, with the order also being preserved as between the two groups.

The functional unit 10 specifically depicted in FIG. 1 is for use with data words and masks, having sixteen bit positions D0 through D15 and M0 through M15, respectively, but it will be appreciated that the number "N" of bit positions may comprise any convenient number.

The sorting network 10 comprises an array of swap modules SWAP-00-0 through SWAP-15-6 (generally identified by reference numeral SWAP-s-$b_s$) organized in a series of "S" swap stages SWAP-00 through SWAP-(S−1) (generally identified by reference numeral SWAP-s). In the first swap stage SWAP-00, each swap module SWAP-00-$b_0$ ($b_0=0, \ldots,$ floor $((N/2)-1)$) receives at respective left and right sets of input terminals a pair of data bits in bit positions Dn and Dn+1 and associated mask bits in bit positions Mn and Mn+1, where n=2b. Each of the left and right input terminal sets of a swap module SWAP-00-$b_0$ receives one data bit and its associated mask bit. Each swap module SWAP-00-$b_0$ has a left and right sets of output terminals for providing output data and mask bits in bit positions $D_0$n, $M_0$n and $D_0$n+1, $M_0$n+1 (subscript "0" referring to the output of swap stage SWAP-00, respectively , that are ordered such that, (i) if the mask bits in bit positions Mn and Mn+1 are both set or both clear, or if the mask bit in bit position Mn is clear and mask bit in bit position Mn+1 is set, the order of the output data and mask bits in bit positions $D_0$n, $M_0$n and $D_0$n+1, $M_0$n+1 at respective left and right output terminals will be preserved, but (ii) if the mask bit in bit position Mn is set and the mask bit in bit position Mn+1 is clear, the order of the output data bits in bit positions $D_0$n and $D_0$n+1 at respective left and right output terminals will be reversed from that of the data bits in bit positions Dn and Dn+1.

That is, if the input data and mask bits in bit positions Dn, Mn and Dn+1, Mn+1, are input to respectively, the left and right input terminal sets of a swap module SWAP-00-$b_0$, the order of the data and mask bits is preserved in the output data and mask bits in bit positions $D_0$n, $M_0$n and $D_0$n+1, $M_0$n+1 at the left and right output terminal sets if (a) the values of the output data and mask bits in bit positions $D_0$n and $M_0$n correspond to the values of the input data and mask bits bit in bit positions Dn and Mn and (b) the values of the output data and mask bits in bit positions $D_0$n+1 and $M_0$n+1 correspond to the values of the input data and mask bits in bit positions Dn+1 and Mn+1.

On the other hand, the order of the output data and mask bits in bit positions $D_0$n, $M_0$n and $D_0$n+1, $M_0$n+1 will be reversed if (c) the values of the output data and mask bits in bit positions $D_0$n and $M_0$n correspond to the values of the input data and mask bits in bit positions Dn+1 and Mn+1 and (d) the values of the output data and mask bits in bit positions $D_0$n+1 and $M_0$n+1 correspond to the values of the input data and mask bits in bit positions Dn and Mn.

It will be appreciated that the swap modules SWAP-00-$b_0$ in the first swap stage SWAP-00 essentially operates to sort the successive pairs data bits Dn and Dn+1 in accordance with the associated mask bits Mn and Mn+1, with the mask bits being used as a sort key. The sort operations performed by the swap modules SWAP-00-$b_0$ in the first swap stage SWAP-00 are performed on the successive data bits in bit positions Dn and Dn+1 in a non-overlapping manner. Thus, for example, the sort operations performed by each swap module SWAP-00-$b_0$ in the first swap stage are performed in connection with bits in bit positions Dn and Dn+1 where n=2$b_0$, and, hence, the left input data bit Dn for one swap module SWAP-00-(n/2) (where "n" is an even integer) is not used as the input data bit in bit position Dn+1 for a swap module SWAP-00-((n/2)−1) to its left. Nor is the input data bit in bit position Dn+1 for swap module SWAP-00-(n/2) the input data bit in bit position Dn for a swap module SWAP-00-((n/2)+1) to its right.

Each swap module SWAP-01-$b_1$ ($b_1=0, \ldots,$ floor$(((N−1)/2)−1)$) in the second swap stage SWAP-01 receives as inputs the output data bit in bit position $D_0$n+1 and associated output mask bit $M_0$n+1 from the right output terminal set of the swap module SWAP-00-$b_0$ in the first swap stage SWAP-00 and the output data bit in bit position $D_0$n and associated output mask bit in bit position $M_0$n from the left output terminal set of swap module SWAP-00-$(b+1)_0$ in the first swap stage SWAP-00, for $b_1=0, \ldots, b_0-1$ and provides output data and associated bits in bit positions $D_1$n, $M_1$n and $D_1$n+1, $M_1$n+1 (subscript "1" referring to the swap stage SWAP-01, and n=2$b_1$+1) at its left and right output terminal sets, respectively. Thus, for example, the first swap module SWAP-01-0 in swap stage SWAP-01 provides output data and mask bits in bit positions $D_1$1 and $M_1$1 at its left output terminal set and data and mask bits in bit positions $D_1$2 and $M_1$2 at its right output terminal set, where indices "1" and "2" correspond to n=2$b_1$+1=2(0)+1=1, and n+1=(2$b_1$+1)+1=2, respectively. As with the swap modules in the first swap stage SWAP-00, the sorting operations performed by the swap modules SWAP-01 in the second swap stage in connection with the data and mask bits provided by the first swap stage SWAP-00 are performed by the swap modules SWAP-00-$b_1$ in a non-overlapping manner.

Swap modules SWAP-02-$b_2$ ($b_2=1, \ldots,$ floor$((N/2)-1)-1$) in the third swap stage SWAP-02 receives at their left input terminal set the output data and mask bits in bit positions $D_1$n+1 and $M_1$n+1 provided by right output terminal set of the swap module SWAP-01-$(b_2-1)$ in the first swap stage SWAP-01, and at their right input terminal set the output data and mask bits in bit positions $D_1$n and $M_1$n provided by the left output terminal set of the swap module SWAP-01-$b_2$ in the first swap stage SWAP-01. In addition, the first swap module SWAP-02-00 in the swap stage SWAP-02 receives at its left input terminal set the output data and mask bits in bit position $D_0$0 and $M_0$0 provided by the left output terminal set provided by the first swap module SWAP-00-0 in the second preceding (in this case, the first) swap stage SWAP-00 and, at its right input terminal set the output data and associated mask bit in bit positions $D_1$1 and $M_1$1 provided by the left output terminal set of the first swap module SWAP-01-0 in the preceding swap stage SWAP-01. Similarly, the last swap module SWAP-02-N/2 in swap stage SWAP-02 receives at its left input terminal set the data and mask bits in bit positions $D_1$n+1, $M_1$n+1 provided by the right input terminal set of the last swap module SWAP-02-floor$((N/2)-1)$ in the preceding swap stage SWAP-02 and at its right input terminal set the output data and mask bits in bit positions $D_0$N/2 and $M_0$N/2 provided by the right output terminal set of the last swap module SWAP-00-N/2 in the second preceding swap stage SWAP-00. Each swap module SWAP-02-$b_2$ performs a sort operation in connection with the data and mask bits that it receives, in a manner similar to that described above in connection with the swap modules SWAP-00-$b_0$, and provides respective output data bits $D_2$n and $D_2$n+1 and associated mask bits, where n=2$b_2$ at its respective left and right output terminal sets.

The successive swap modules in the fourth, sixth, . . . swap stages SWAP-03, SWAP-05, . . . (generally, swap stages SWAP-s, for "s" an odd integer) are constructed and connected in the sorting network 10 in a manner similar to swap stage SWAP-01, and the successive swap modules in the fifth, seventh, . . . swap stages SWAP-04, SWAP-06 (generally swap stages SWAP-s for "s" an even integer) are constructed and connected in the sorting network 10 in a manner similar to swap stage SWAP-02. For the number "N" of data bits and associated mask bits, the number of swap stages in the sorting network 10 will equal N. Thus, after the last swap stage SWAP-N, the data bits in bit positions D0, ..., DN−1 of the input data word will be completely sorted according to the mask bits as a sort key, with order of the data bits being preserved according to those mask bits which are set and those which are clear.

That an N-swap stage sorting network 10 sorts the data bits D0, ..., DN−1 of the input data bits according to the mask bits as a sort key, with the order of the data bits being preserved according to the mask bits which are set and those which are clear, for "N" a power of two, will be apparent by induction. Thus, for N=2 ($Log_2N=1$), a sorting network comprising a single swap module, for example, swap module SWAP-00-0 will clearly suffice to sort input data bits D0 and D1 according to mask bits M0 and M1. This follows from the description of the operation of the swap modules above.

Figure 2:
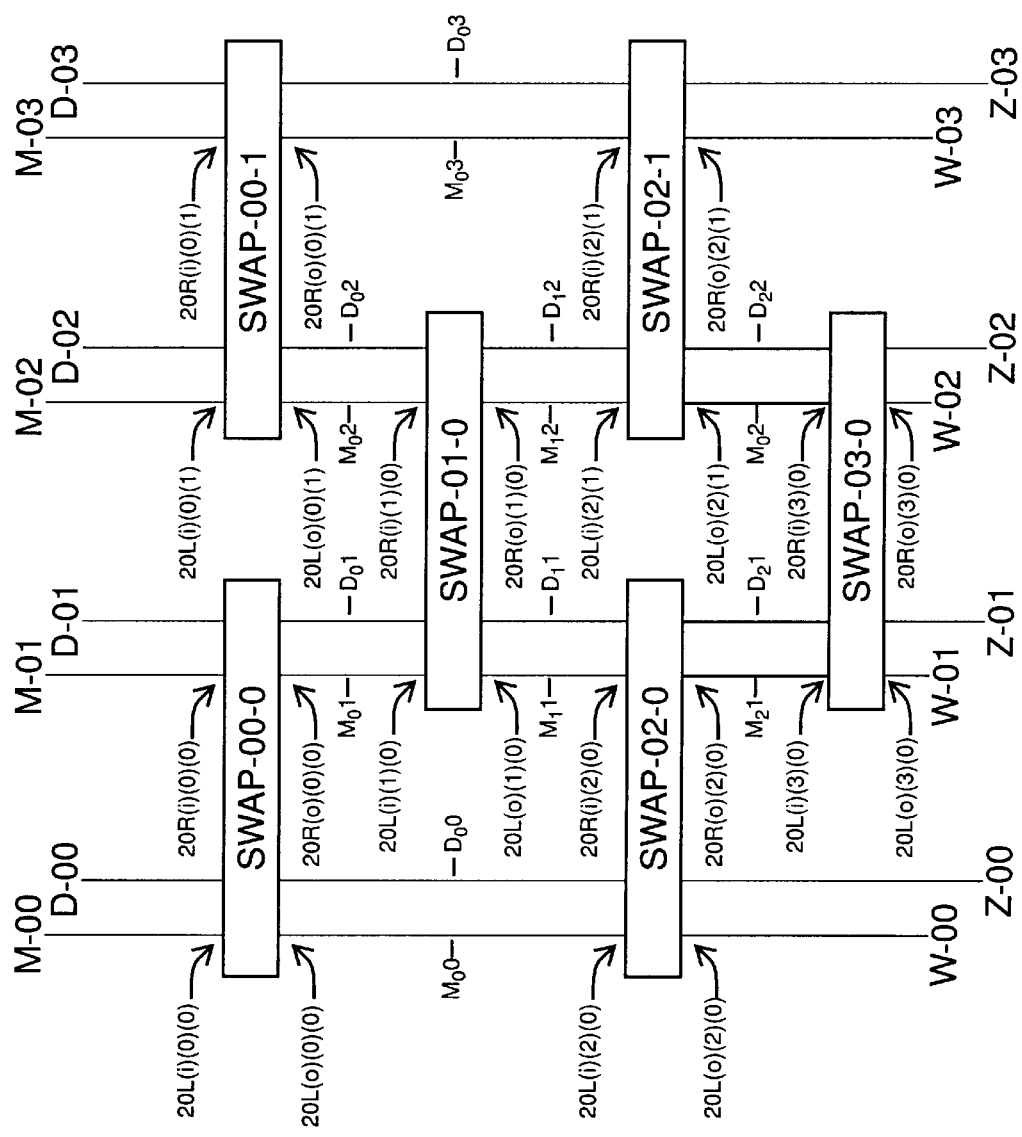
FIG. 2 depicts a portion of the circuit depicted in FIG. 1.
Figure 3:
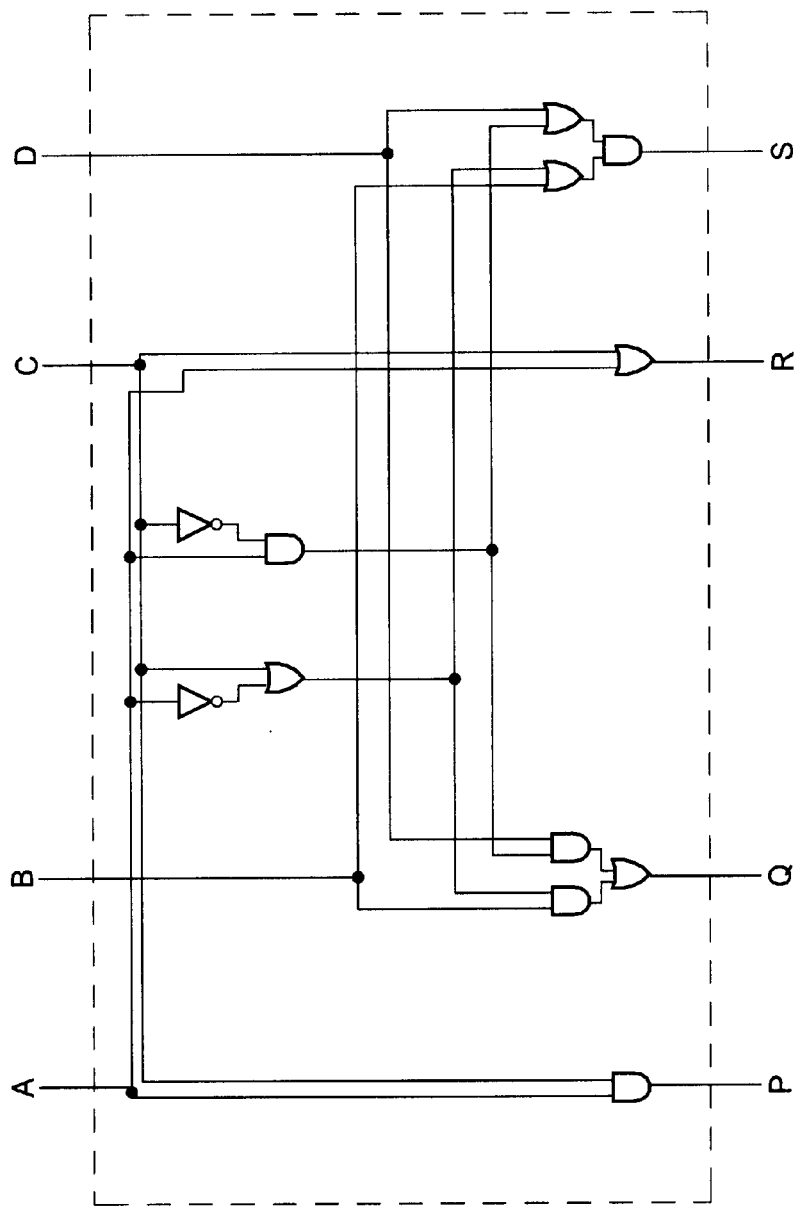
FIG. 3 depicts a logical implementation of a circuit element depicted in FIG. 1.
Figure 3:
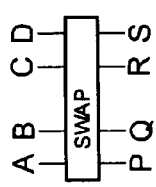

For N=4, a four-stage sorting network comprising swap modules SWAP-00-0 and SWAP-00-1 in the first swap stage SWAP-00, swap module SWAP-01-0 in the second swap stage SWAP-01, swap modules SWAP-02-00 and SWAP-02-01 in the third swap stage, and SWAP-03-0 in the fourth swap stage SWAP-03 will suffice to sort input data bits D0 through D3 according to mask bits M0 through M3. An illustrative four-stage sorting network, identified by reference numeral 12, is depicted in FIG. 2. With reference to FIG. 2, the swap module SWAP-00-0 in the first swap stage SWAP-00
  (i) receives
    (a) the mask and data bits in bit positions M0 and D0 at its left input terminal set 20L(i)(0)(0) (index "L" referring to "left," index "i" referring to "input terminal set," first index "0" referring to the swap stage, in this case SWAP-00, and second index "0" referring to the index of the swap module within the swap stage, in this case SWAP-00-0) and
    (b) the mask and data bits in bit positions M1 and D1 at its right input terminal set 20R(i)(0)(0) (index "R" referring to "right" index "i"referring to "input terminal set," . . . first index "0" referring to the swap stage, in this case SWAP-00, and second index "0" referring to the index of the swap module within the swap stage, in this case SWAP-00-0), and
  (ii) provides
    (a) the mask and data bits in bit positions $M_o0$ and $D_o0$ at its left output terminal set 20L(o)(0)(0) (index "L" referring to "left," index "o" referring to "output terminal set," first index "0" referring to the swap stage, in this case SWAP-00, and second index "0" referring to the index of the swap module within the swap stage, in this case SWAP-00-0) and
    (b) the mask and data bits in bit positions $M_o1$ and $D_o1$ at its right output terminal set 20R(1)(0)(0) (index "R" referring to "right" index "i" referring to "input terminal set," first index "0" referring to the swap stage, in this case SWAP-00, and second index "0" referring to the index of the swap module within the swap stage, in this case SWAP-00-0).
Similarly, swap module SWAP-00-1 in swap stage SWAP-00
  (i) receives
    (a) the mask and data bits in bit positions M2 and D2 at its left input terminal set 20L(i)(0)(1) and
    (b) the mask and data bits in bit positions M3 and D3 at its right input terminal set 20R(i)(0)(1), and
  (ii) provides
    (a) the mask and data bits in bit positions $M_o2$ and $D_o2$ at its left output terminal set 20L(o)(0)(1) and
    (b) the mask and data bits in bit positions $M_o3$ and $D_o3$ at its right input terminal set 20R(i)(0)(0).

For swap stage SWAP-01, the data and mask bits in bit positions $D_o1$ and $M_o1$ from the right output terminal set 20R(o)(0)(0) of the swap module SWAP-00-0 are provided to the left input terminal set 20L(i)(1)(0) of swap module SWAP-01-0 and the data and mask bits in bit positions $D_o2$ and $M_o2$ from the left output terminal set 20L(o)(0)(1) of the swap module SWAP-00-1 are provided to the right input terminal set 20R(i)(1)(0) of swap module SWAP-01-0. Swap module SWAP-01-0, in turn, provides data and mask bits in bit positions $D_l1$, $M_l1$ and $D_l2$, $M_l2$ at respective output terminal sets 20L(o)(1)(0) and 20L(o)(1)(0). The other swap modules SWAP-02-0, SWAP-02-1 and SWAP-03-0 in the sorting network 12 are connected to respective ones of the swap modules SWAP-00-0, SWAP-00-1, SWAP-01-0 and each other as depicted in FIG. 2.

In the following, it will be assumed that the data bits have values represented by letters "a"through "d," with the input data word corresponding to "abcd." In addition, it will be assumed that the mask bits have values represented by numbers "1" and "0," where "1" represents a set mask bit and "0" represents a clear mask bit.

It is straightforward to verify, for the sixteen patterns of mask bits for "0000"through "1111," that the sorting network provides the appropriate outputs patterns for the data bits. For example, mask bit pattern "0000,"

| Input data mask pattern | a/0 | b/0 | c/0 | d/0 |
| --- | --- | --- | --- | --- |
| Output of SWAP-00 | a/0 | b/0 | c/0 | d/0 |
| Output of SWAP-01 | ↓ | b/0 | c/0 | ↓ |
| Output of SWAP-02 | a/0 | b/0 | c/0 | d/0 |
| Output of SWAP-03 | ↓ | b/0 | c/0 | ↓ |
| Output mask and data bit pattern | a/0 | b/0 | c/0 | d/0 | where the downwardly directed arrow indicates that there is no swap module in the respective swap stage. Similarly, for mask pattern "0001,"

| Input data mask pattern | a/0 | b/0 | c/0 | d/1 |
| --- | --- | --- | --- | --- |
| Output of SWAP-00 | a/0 | b/0 | c/0 | d/1 |
| Output of SWAP-01 | ↓ | b/0 | c/0 | ↓ |
| Output of SWAP-02 | a/0 | b/0 | c/0 | d/1 |
| Output of SWAP-03 | ↓ | b/0 | c/0 | ↓ |
| Output mask and data bit pattern | a/0 | b/0 | c/0 | d/1 |

On the other hand, for mask bit pattern "1000,"

| Input data mask pattern | a/1 | b/0 | c/0 | d/0 |
| --- | --- | --- | --- | --- |
| Output of SWAP-00 | b/0 | a/1 | c/0 | d/0 |
| Output of SWAP-01 | ↓ | c/0 | a/1 | ↓ |
| Output of SWAP-02 | b/0 | c/0 | d/0 | a/1 |
| Output of SWAP-03 | ↓ | c/0 | d/0 | ↓ |
| Output mask and data bit pattern | b/0 | c/0 | d/0 | a/1 |

It will be apparent for this example that the sorting network maintains the order "bcd" of data bits in the data word which are associated with the clear mask bits. This will also be apparent from examining mask bit pattern "0010":

| Input data and mask bit pattern | a/0 | b/0 | c/1 | d/0 |
|---|---|---|---|---|
| Output of SWAP-00 | a/0 | b/0 | d/0 | c/1 |
| Output of SWAP-01 | ↓ | b/0 | d/0 | ↓ |
| Output of SWAP-02 | a/0 | b/0 | d/0 | c/1 |
| Output of SWAP-03 | ↓ | b/0 | d/0 | ↓ |
| Output mask and data bit pattern | a/0 | b/0 | d/0 | c/1 | which preserves the order of data bits "abd" and which are associated with clear mask bits, and mask bit pattern "0100".

| Input data and mask bit pattern | a/0 | b/1 | c/0 | d/0 |
|---|---|---|---|---|
| Output of SWAP-00 | a/0 | b/1 | c/0 | d/0 |
| Output of SWAP-01 | ↓ | c/0 | b/1 | ↓ |
| Output of SWAP-02 | a/0 | c/0 | d/0 | b/1 |
| Output of SWAP-03 | ↓ | c/0 | d/0 | ↓ |
| Output mask and data bit pattern | a/0 | c/0 | d/0 | b/1 | which preserves the order of data bits "acd" which are associated with clear mask bits. That the sorting network maintains the order of data bits which are associated with set mask bits will be apparent from examining, for example, mask bit pattern "1110":

| Input data and mask bit pattern | a/1 | b/1 | c/1 | d/0 |
|---|---|---|---|---|
| Output of SWAP-00 | a/1 | b/1 | d/0 | c/1 |
| Output of SWAP-01 | ↓ | d/0 | b/1 | ↓ |
| Output of SWAP-02 | d/0 | a/1 | b/1 | c/1 |
| Output of SWAP-03 | ↓ | a/1 | b/1 | ↓ |
| Output mask and data bit pattern | d/0 | a/1 | b/1 | c/1 | which preserves order of data bits "abc" which are associated with set mask bits, mask bit pattern "1010":

| Input data and mask bit pattern | a/1 | b/0 | c/1 | d/0 |
|---|---|---|---|---|
| Output of SWAP-00 | b/0 | a/1 | d/0 | c/1 |
| Output of SWAP-01 | ↓ | d/0 | a/1 | ↓ |
| Output of SWAP-02 | b/0 | d/0 | a/1 | c/1 |
| Output of SWAP-03 | ↓ | d/0 | a/1 | ↓ |
| Output mask and data bit pattern | b/0 | d/0 | a/1 | c/1 | which preserves order of data bits "ac" which are associated with set mask bits, and "bd" which are associated with clear mask bits, and mask bit pattern "1100":

| Input data and mask bit pattern | a/1 | b/1 | c/0 | d/0 |
|---|---|---|---|---|
| Output of SWAP-00 | a/1 | b/1 | c/0 | d/0 |
| Output of SWAP-01 | ↓ | c/0 | b/1 | ↓ |
| Output of SWAP-02 | c/0 | a/1 | d/0 | b/1 |
| Output of SWAP-03 | ↓ | d/0 | a/1 | ↓ |
| Output mask and data bit pattern | c/0 | d/0 | a/1 | b/1 | which also preserves order of data bits "ab" which are associated with set mask bits and "cd" which are associated with clear mask bits.

That the sorting network for the number "N" of data bits corresponding to N=4 for other mask bit patterns operates to sort the data bits D0, ..., D3 of the input data bits according to the mask bits as a sort key, with the order of the data bits being preserved according to the mask bits which are set and those which are clear, will be apparent to those skilled in the art. By induction, a similarly-constructed sorting network (the sorting network 10 described in connection with FIG. 1 is constructed similarly for N=16) will serve to do similarly for that number of data bits. It will be appreciated that, if the number of data bits N in the data word is not a power of two, since order is preserved among the set and clear data bits, the data word can be padded to the right with bits sufficient to provide a number N' of data bits which is a power of two.

All of the swap modules SWAP-s-b are generally similar, and FIG. 2 depicts a logic diagram of a swap module useful in the functional unit 10 described above in connection with FIG. 1. Generally, the swap module depicted in FIG. 2 receives four input signals identified as A, B, C and D, and generates four output signals identified as P, Q, R and S. The input signals A and C are representative of the input mask bits Mn and Mn+1, respectively, and input signals B and D are representative of the input data bits Dn and Dn+1, respectively. Similarly, the output signals P and R are representative of the output mask bits, for example, output mask bits $M_On$ and $M_On+1$, respectively, and the output signals Q and S are representative of the output data bits, for example, output data bits $D_On$ and $D_On+1$, respectively. Otherwise state, the input signals A and B are received at a left input terminal set, the input signals C and D are received at a right input terminal set, the output signals P and Q are provided through a left output terminal set, and the output signals R and S are provided through a right output terminal set. The swap module generates the output signals P, Q, R and S as follows:

$$P = A \text{ and } C \qquad (1)$$

$$Q = ((C \text{ or not-}A) \text{ and } B) \text{ or } ((A \text{ and not-}C) \text{ and } D) \qquad (2)$$

$$R = A \text{ or } C \qquad (3)$$

$$S = ((C \text{ or not-}A) \text{ or } B) \text{ and } ((A \text{ and not-}C) \text{ or } D) \qquad (4)$$

where "and," "or," and "not" refers to the corresponding Boolean logical operation. It will be appreciated that these output signals provide the appropriate signals representative of the desired left and right output data and mask bits $D_On$, $D_On+1$, $M_On$ and $M_On+1$ since:

(i) the output signal P, representative of the left output mask bit $M_On$, will (from (1)) be
  (a) negated, representative of a clear output mask bit $M_On$, if one or both of the input signals A and C, representative of the left and right input mask bits Mn and Mn+1, are negated, thereby indicating that one or both of the left and right input mask bits is clear, or
  (b) asserted, representative of a set output mask bit $M_On$, only if both of the input signals A and C are asserted, thereby indicating that both of the left and right input mask bits are set, (ii) the output signal R, representative of the right output mask bit $M_On+1$, will (from (2)) be
  (a) negated, representative of a clear output mask bit $M_On+1$, if both of the input signals A and C are negated, thereby indicating that both of the left and right input mask bits are clear, or
  (b) asserted, representative of a set output mask bit $M_On+1$, if one or both of the input signals A and C are asserted, thereby indicating that one or both of the left and right input mask bits are set, (iii) the output signal Q, representative of the left output data bit $D_On$, will (from 3)
  (a) correspond to the input signal B, representative of the value of the left input data bit Dn, if the input signal A is negated, indicating that the left mask bit Mn is clear, or if the input signal C is asserted, indicating that the right mask bit Mn+1 is set, and (b) correspond to the input signal D, representative of the value of the right input data bit Dn+1, if both the input signal A is asserted and the input signal C is negated, indicating both that the left mask bit Mn is set and that the right mask bit Mn+1 is clear, and (iv) the output signal S, representative of the right output data bit $D_On+1$ will (from (4))

(a) correspond to the input signal D, representative of the value of the right input data bit Dn+1, if the input signal C is asserted or the input signal A is negated, indicating that either the right mask bit Mn+1 is set or the left mask bit Mn is clear, and (b) correspond to the input signal B, representative of the value of the left input data bit Dn, if both the input signal A is asserted and the input signal C is negated, indicating both that the left mask bit Mn is set and that the right mask bit Mn+1 is clear.

From (4) the output signal S also corresponds to the logical OR of the signal described above in connection with (iv)(a) and (iv)(b) and (c) a signal corresponding to the logical "and" of one composite signal corresponding to the logical "or" of the input signal C and the complement of the input signal A, on the one hand, and another composite signal corresponding to the logical "and" of the input signal A and the complement of the input signal C, but it will be appreciated that the two composite signals are complements of each other and thus the logical "and" of them will always be negated, and (d) a signal corresponding to the logical "and" of the B and D input signals, but it will be appreciated that this signal would be asserted only if both the B and D input signals are asserted and so this signal will be asserted only if one of the signals identified above in connection with (iv)(a) or (iv)(b) is asserted.

FIG. 2 depicts an illustrative logic circuit which generates the outputs P, Q, R and S from inputs A, B, C, and D as described above in connection with (1) through (4). The operation of the logic circuit will be apparent to those skilled in the art and will not be described further herein.

The invention provides a number of advantages. In particular, the invention provides a functional unit for efficiently executing a "sheep and goats" instruction, in which bits Dn of a data word are rearranged according to bits Mn of a mask word, so that all bits Dn of the data word are divided into two groups as defined by bits of a mask word, one group (the "sheep") corresponding to those bits for which the bits of the mask word are clear, and the other (the "goats") corresponding to those bits for which the bits of the mask word are set, and in addition preserves order of the data bits in each group.

It will be appreciated that a number of modifications may be made to the functional unit described above in connection with FIGS. 1 and 2. For example, it will be apparent that the functional unit can readily be modified to operate so that the data bits associated with the mask bits which are set are shifted to the left and the data bits associated with the mask bits which are clear are shifted to the right.

Furthermore, although the invention has been described in connection with rearranging portions of a data word comprising single-bit units, each associated with a bit of the mask word, it will be apparent that the invention can be used in connection with rearranging multi-bit data word units, with each unit being associated with a bit of the mask word.

In that case, each of the swap modules will receive, instead of a single bit, the corresponding multi-bit portion and provide as an output a corresponding multi-bit portion.

In addition, although the functional unit has been described as rearranging a sixteen bit data word Dn according to the bits of a sixteen bit mask word Mn, it will be appreciated that the functional unit may be extended to rearrange a data word of any size.

Furthermore, although the functional unit has been described as making use of swap modules implemented using a particular circuit described above in connection with FIG. 2, it will be appreciated that the swap modules can be implemented using a number of diverse circuits, including but not limited to circuits including multiplexers, whose structure will be readily apparent to those skilled in the art.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. For producing an electrical output signal representing an array-output data word in response to electrical input signals representing an array-input data word and an array-input mask word, where each of the data words comprises N data units in respective data-unit positions $D_n$ and the mask word comprises N mask bits in respective mask-bit positions $B_n$, where n=0, 1, 2, . . . , N−1, by rearranging the data units of the array input data word in accordance with the bits of the array-input mask word, a centrifuge circuit comprising an array of interconnected swap modules wherein:

A) the swap modules are organized in a series of M swap stages $S_m$, where m=0, 1, 2, . . . , M−1;

B) each of the swap stages is associated with a respective stage-input data word and a respective stage-output data word, each of which comprises N data units in respective data-unit positions $D_n$, where n=0, 1, 2, . . . , N−1, and with a stage-input mask word that comprises mask bits in respective mask-bit positions $B_n$, where n=0, 1, 2, . . . , N−1;

C) the stage-input data and mask words associated with stage $S_0$ are the array-input data and mask words, D) at least each of the swap stages $S_m$ such that m<M−1 is associated with a respective stage-output mask word that comprises mask bits in respective mask-bit positions $B_n$, where n=0, 1, 2, . . . , N−1;

E) the stage-output data and mask words associated with each swap stage $S_m$ such that m<M−1 are the stage-input data and mask words, respectively, associated with the respective swap stage $S_{m+1}$;

F) the stage-output data word associated with swap stage $S_{M-1}$ is the array output data word;

G) each swap stage is associated with a respective plurality of non-overlapping pairs of integers n and n+1, with each of which a different one of the swap modules in that stage is associated, and each of those swap modules receives the mask bits in mask-bit positions $M_n$ and $M_{n+1}$ of the stage-input data word associated with that swap stage, where n and n+1 are the pair of integers associated with that swap module;

H) in at least each swap stage but the last, each swap module forwards the mask bits thus received as the mask bits at those mask-bit positions of the stage-output mask word associated with that swap stage:
   i) in reverse order if those mask bits received by that swap module from positions $M_n$ and $M_{n+1}$ are set and clear, respectively, and
   ii) in forward order otherwise;

I) for the integers n and n+1 associated therewith, each swap module in a given swap stage receives the data units in data-unit positions $D_n$ and $D_{n+1}$ of the stage-input data word associated with that swap stage and forwards them as the data units in data-unit positions $D_n$ and $D_{n+1}$ of the stage-input data word associated with that swap stage:
   i) in reverse order if the received mask bit received by that swap module from positions $M_n$ and $M_{n+1}$ are set and clear, respectively; and
   ii) in forward order otherwise; and J) the swap modules are so staggered that, for each m<M−1 such the integers n in the integer pairs n and n+1 associated with the swap modules in swap stage $S_m$ are even, the integers n in the integer pairs n and n+1 associated with the swap modules in swap stage $S_{m+1}$ are odd.

2. A centrifuge circuit as defined in claim 1 wherein:

A) the pairs of overlapping integers associated with each swap stage $S_m$ such that m is even are every pair of non-negative integers n and n+1 such that n is even and less than N−1;

B) the pairs of overlapping integers associated with each swap stage $S_m$ such that m is odd are every pair of odd non-negative integers n and n+1 such that n is odd and less than N−1.

3. A centrifuge circuit as defined in claims 2 wherein M=N.

4. A centrifuge circuit as defined in claim 1 wherein M=N.

\* \* \* \* \*